US009985541B2

(12) United States Patent
Luo et al.

(10) Patent No.: US 9,985,541 B2
(45) Date of Patent: May 29, 2018

(54) FEED FORWARD CONTROLLING CIRCUIT AND METHOD FOR VOLTAGE RIPPLE RESTRAINT

(71) Applicant: ACBEL POLYTECH INC., New Taipei (TW)

(72) Inventors: Cheng-Hsiao Luo, New Taipei (TW); Wei-Liang Lin, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 0 days. days.

(21) Appl. No.: 15/236,759

(22) Filed: Aug. 15, 2016

(65) Prior Publication Data

US 2017/0207713 A1    Jul. 20, 2017

(30) Foreign Application Priority Data

Jan. 20, 2016 (TW) .............................. 105101778 A

(51) Int. Cl.
*H02M 3/335* (2006.01)
*H02M 1/42* (2007.01)
*H02M 1/15* (2006.01)

(52) U.S. Cl.
CPC ......... *H02M 3/33546* (2013.01); *H02M 1/15* (2013.01); *H02M 1/4208* (2013.01)

(58) Field of Classification Search
CPC ..................................................... H02M 1/15
See application file for complete search history.

(56) References Cited

U.S. PATENT DOCUMENTS

| 7,019,503 | B1* | 3/2006 | Ortiz | H02M 1/15 |
| | | | | 323/222 |
| 9,065,401 | B2* | 6/2015 | Fang | H03F 21/00 |
| 9,397,578 | B2* | 7/2016 | Karlsson | H02M 1/08 |
| 2001/0030529 | A1* | 10/2001 | Stanley | H02M 3/156 |
| | | | | 323/280 |
| 2006/0006933 | A1* | 1/2006 | Nguyen | H03F 1/32 |
| | | | | 330/10 |
| 2013/0121047 | A1* | 5/2013 | Lin | H02M 1/4225 |
| | | | | 363/84 |
| 2013/0134892 | A1* | 5/2013 | Kado | H02M 3/33523 |
| | | | | 315/206 |
| 2017/0025961 | A1* | 1/2017 | Seeman | H02M 1/08 |

* cited by examiner

*Primary Examiner* — Jeffrey Gblende
*Assistant Examiner* — David A. Singh
(74) *Attorney, Agent, or Firm* — Muncy, Geissler, Olds & Lowe, P.C.

(57) ABSTRACT

A feed forward controlling circuit is used to perform a feed forward controlling method to restrain ripple of the output voltage in a power converter. The power converter is controlled by a control signal outputted from an output terminal of a controller. The method includes steps of: receiving an output voltage from an output terminal of a voltage converter; attenuating the output voltage to generate an electrical signal; acquiring a DC signal from the electrical signal; and obtaining a ripple compensation signal in accordance with the electrical signal and the DC signal to output to an output terminal of a controller. The output terminal of the controller outputs a control signal to control the power converter.

10 Claims, 17 Drawing Sheets

FEED FORWARD CONTROLLING CIRCUIT AND METHOD FOR VOLTAGE RIPPLE RESTRAINT

CROSS-REFERENCE TO RELATED APPLICATIONS

This application claims the benefit of Taiwan patent application No. 105101778, filed on Jan. 20, 2016, the disclosure of which is incorporated herein in its entirety by reference.

BACKGROUND OF THE INVENTION

1. Field of the Invention

The present invention relates to a feed forward controlling circuit and method, and more particularly to a feed forward controlling circuit and method for voltage ripple restraint.

2. Description of Related Art

Generally, mains power provided by a power company is AC (Alternating Current) power, but many electronic devices have to use DC (Direct Current) power. Therefore, the AC power is required to be converted into DC power for the electronic devices to use.

However, during the process for converting the AC power to the DC power, some of the AC portion cannot be completely removed from the DC power and the AC portion, which is not eliminated, will generate ripples.

Accordingly, the conventional technique provides a power supply for ripple restraint. With reference to FIG. 14, the power supply includes a rectifier 41, a power factor controller (PFC) 42, a power converter 43, a feedback circuit 44, a controller 45, a ripple detecting module 46, a communicating module 47, and a compensation processing module 48.

The rectifier 41 is electrically connected with an AC power source 50 and receives an AC power from the AC power source 50. The rectifier 41 converts the AC power into a DC power and outputs the DC power. The power factor controller 42 is electrically connected with the rectifier 41 and the power converter 43, and receives the DC power. The power factor controller 42 corrects power factor of the DC power and outputs the DC power to the power converter 43. The power converter 43 is electrically connected to the controller 45 and receives a control signal generated by the controller 45. The power converter 43 includes a power output terminal to output an output voltage Vout.

The feedback circuit 44 is electrically connected with the output terminal of the power converter 43 to detect the output voltage Vout. The feedback circuit 44 generates a feedback signal in accordance with the output voltage Vout and outputs the feedback signal to the controller 45. The controller 45 adjusts the control signal in accordance with the feedback signal to stabilize the output voltage Vout.

The ripple detecting module 46 is electrically connected with an input terminal of the power converter 43 to detect ripple in the DC power which is corrected by the PFC 42. The communication module 47 is electrically connected with the ripple detecting module 46 to receive the ripple detected by the ripple detecting module 46 and transmits the ripple to the compensation processing module 48. The compensation module 48 generates a compensation signal in accordance with the ripple, and outputs the compensation signal to the output terminal of the power converter 43 so as to compensate the power voltage Vout from the output terminal of the power converter 43 and reduce the ripple in the power voltage Vout.

However, the input terminal and the output terminal of the power converter 43 are respectively a primary side and a secondary side of the power converter 34. The primary side and the secondary side are separated from each other. Therefore, when the aforementioned method is used to reduce the ripple, the ripple signal detected at the primary side of the power converter 34 is processed first and then the ripple signal is transmitted to the secondary side of the power converter 45 via the communication module 47 so as to compensate the output voltage Vout. Accordingly, the circuit design is extremely difficult and it is necessary to improve the conventional manner to reduce the ripple.

SUMMARY OF THE INVENTION

Since the conventional power supply for ripple restraint requires implementing the communication module to transmit data, signal interruption easily occurs. The cost is increased by adding the communication module and the difficulty of the circuit design is increased. A feed forward controlling circuit and a method for ripple voltage restraint are provided in the present invention. The feed forward controlling circuit for ripple voltage restraint is connected with a power converter and a controller to reduce voltage ripple of an output voltage from the power converter. An output terminal of the controller outputs a control signal to control the power converter. The feed forward controlling circuit for voltage ripple restraint includes a feedback attenuation module, a first filter module, and a first subtracting amplifier module. The feedback attenuation module includes an attenuation input terminal and an attenuation output terminal. The attenuation input terminal is connected with an output terminal of the power converter to receive the output voltage and attenuating the output voltage to generate an electrical signal. The attenuation output terminal outputs the electrical signal. The first filter module is electrically connected with the attenuation output terminal of the feedback attenuation module to receive the electrical signal and filter AC portion in the electrical signal so as to generate a DC signal. The subtracting amplifier module is electrically connected with the attenuation output terminal of the feedback attenuation module and the first filter module to receive the electrical signal and the DC signal and calculate a difference between the electrical signal and the DC signal, and the subtracting amplifier module further amplifies the difference to generate a ripple compensation signal and output the ripple compensation signal to the output terminal of the controller.

A feed forward controlling method for voltage ripple restraint comprises the following steps: receiving an output voltage from an output terminal of a voltage converter; attenuating the output voltage to generate an electrical signal; acquiring a DC signal from the electrical signal; obtaining a ripple compensation signal in accordance with the electrical signal and the DC signal to output to an output terminal of a controller; the output terminal of the controller outputs a control signal to control the power converter.

The feed forward controlling circuit and method for voltage ripple restraint in the present invention are capable of generating a ripple compensation signal in accordance with the output signal at the secondary side so as to perform a feed forward control in the input signal of the power converter to restrain the generation of the ripple. The present invention doesn't include the communication module, so as to reduce the cost and minimum the difficulty of the circuit design.

DETAILED DESCRIPTION OF THE PREFERRED EMBODIMENT

These and other aspects of the embodiments herein will be better appreciated and understood when considered in conjunction with the following description and the accompanying drawings.

Figure 1:
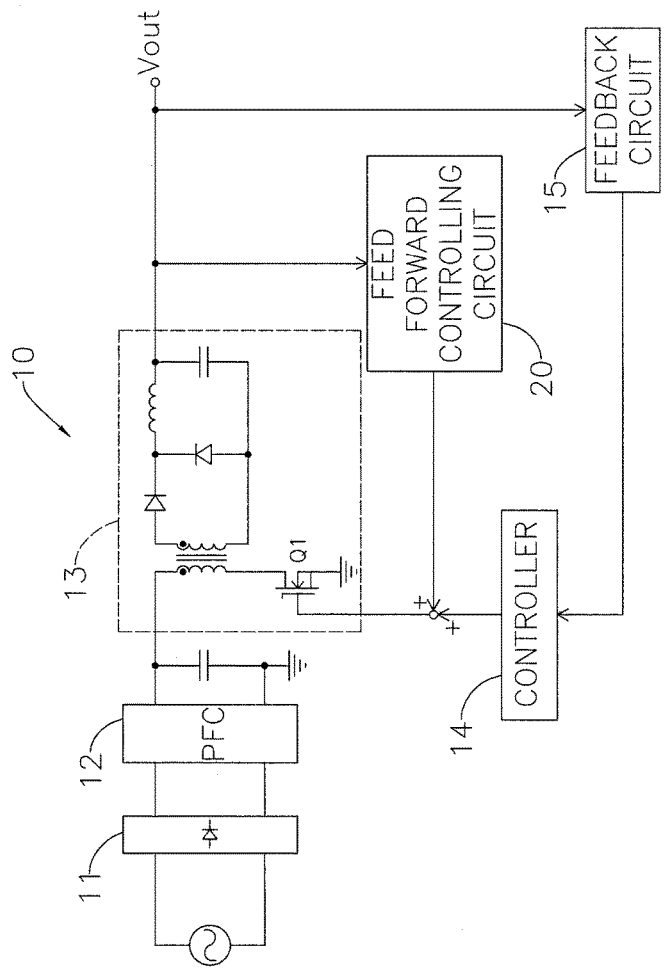
FIG. 1 is a system block diagram of a feed forward controlling circuit for voltage ripple restraint used in a power supply in a preferred embodiment of the present invention.

With reference to FIG. 1, the present invention provides a feed forward controlling circuit 20 for voltage ripple restraint used in a power supply 10. The power supply 10 includes a rectifier 11, a power factor controller (PFC) 12, a power converter 13, a controller 14 and a feedback circuit 15. The rectifier 11 of the power supply 10 is electrically connected with a mains power 30 to receive an AC (Alternative Current) power and converts the AC power into a DC (Direct Current) power. The power factor controller 12 is electrically connected with the rectifier 11 and the power converter 13. The power factor controller 12 receives the DC power outputted from the rectifier 11 and corrects a power factor of the DC power to be outputted to an input terminal of the power converter 13. An output terminal of the power converter 13 outputs an output voltage Vout. The controller 14 is electrically connected with the power converter 13 and generates a control signal that is outputted from an output terminal of the controller 14. The control signal is used to control the power converter 13 to output the output voltage Vout. The feedback circuit 15 is electrically connected with the output terminal of the power converter 13 to receive the output voltage Vout so as to generate a feedback signal. The feedback signal is used for the controller 14 to adjust a control signal thereof to stabilize the output voltage Vout of the power converter 13.

In the preferred embodiment, the power converter 13 is a DC/DC converter and includes a transformer (T), a switch (Q1) connected with a primary side of the transformer (T), and an output circuit connected with a secondary side of the transformer (T). The switch (Q1) is a metal oxide semiconductor field effect transistor (MOSFET) and a gate electrode thereof is connected with the output terminal of the controller 14. The controller 14 includes a proportional-integral-derivative (PID) controlling module and the control signal outputted from the controller 14 is used to control the switch (Q1).

Figure 2:
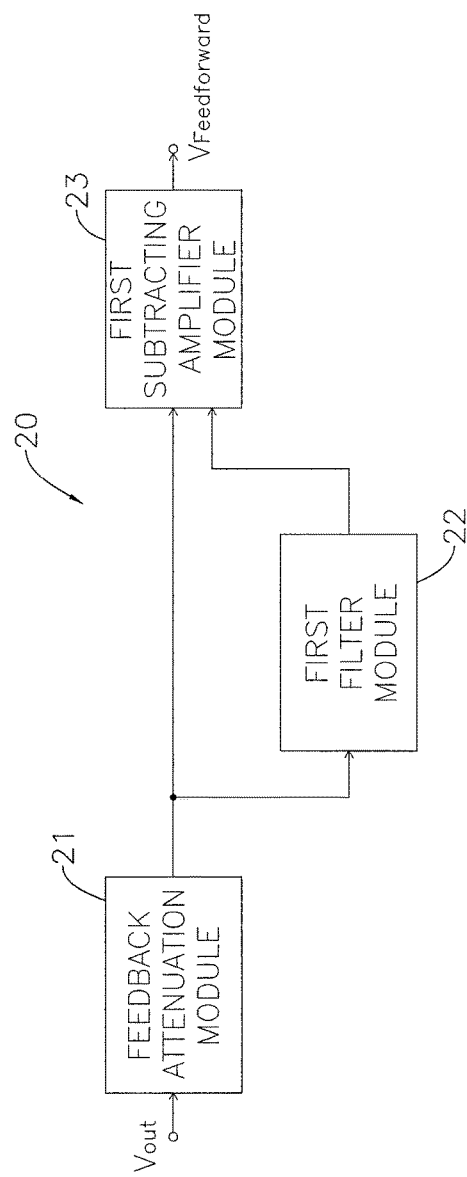
FIG. 2 is a system block diagram in the preferred embodiment of the present invention.

With reference to FIG. 1 and FIG. 2, the feed forward controlling circuit 20 for ripple voltage restraint is electrically connected with the output terminal of the power converter 13 and the output terminal of the controller 14 to restrain voltage ripple of the output voltage Vout of the power converter 13. The feed forward controlling circuit 20 for voltage ripple restraint includes a feedback attenuation module 21, a first filter module 22, and a first subtracting amplifier module 23.

The feedback attenuation module 21 includes an attenuation input terminal and an attenuation output terminal. The attenuation input terminal is electrically connected with the output terminal of the power converter 13 to receive the output voltage Vout and attenuates the output voltage Vout to generate an electrical signal. The attenuation output terminal outputs the electrical signal. The first filter module 22 is electrically connected with the attenuation output terminal of the feedback attenuation module 21 and receives the electrical signal. The first filter module 22 filters AC portion in the electrical signal to generate a DC signal. The first subtracting amplifier module 23 is electrically connected with the attenuation output terminal of the feedback attenuation module 21 and the first filter module 22 to receive the electrical signal and the DC signal. The first subtracting amplifier module 23 calculates a difference between the electrical signal and the DC signal, and amplifies the difference to generate a ripple compensation signal $V_{feedforward}$. The ripple compensation signal $V_{feedforward}$ is outputted to the output terminal of the controller 14 and performs a feed forward control in the control signal generated by the controller 14 so as to restrain the voltage ripple of the output voltage Vout. In addition, the difference between the electrical signal and the DC signal may be a positive value or a negative value, so the ripple compensation signal $V_{feedforward}$ may be positive or negative. Therefore, the ripple is restrained by the ripple compensation signal $V_{feedforward}$ with positive or negative values.

The feed forward controlling circuit 20 for ripple voltage restraint generates the ripple compensation signal $V_{feedforward}$ in accordance with the output signal at the secondary side of the power converter 13. The ripple compensation signal $V_{feedforward}$ is used to perform a feed forward control in the control signal inputted to the power converter 13 so as to restrain the generation of the ripple. Therefore, the present invention does not require an additional communication module to transmit signals. The cost is decreased and the difficulty of the circuit design is reduced.

Figure 3:
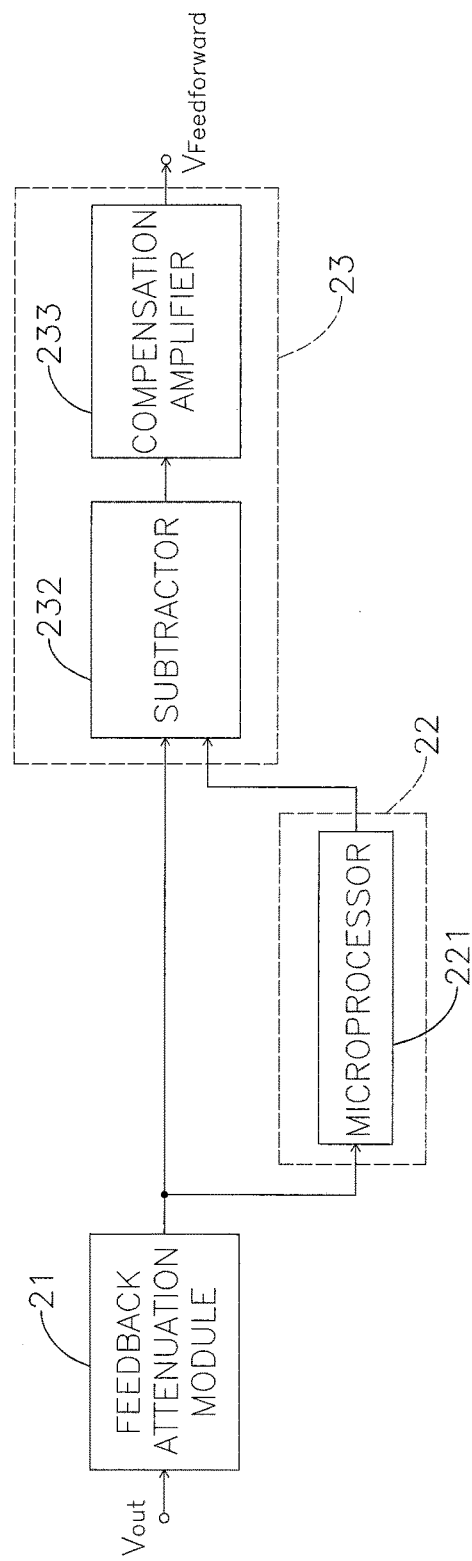
FIG. 3 is a system block diagram by using a digital processing in the preferred embodiment of the present invention.

With reference to FIG. 1 and FIG. 3, in the present invention, the feed forward controlling circuit 20 for ripple voltage restraint used in the digital processing includes a feedback attenuation module 21, a first filter module 22 and a first subtracting amplifier module 23.

The feedback attenuation module 21 is electrically connected with the output terminal of the power converter 13 to receive the output voltage Vout. The feedback attenuation module 21 attenuates the output voltage Vout and generates the electrical signal. The first filter module 22 is a microprocessor 221 to receive the electrical signal. The first filter module 22 filters the AC portion in the electrical signal to generate and output the DC signal. The first subtracting amplifier module 23 is electrically connected with the feedback attenuation module 21 and the first filter module 22. The first subtracting amplifier module 23 receives and amplifies the difference between the electrical signal and the DC signal to generate a ripple compensation signal $V_{feedforward}$. The ripple compensation signal $V_{feedforward}$ is outputted to the output terminal of the controller 14 and performs the feed forward control in the control signal generated by the controller 14 so as to restrain the voltage ripple in the output voltage Vout.

The microprocessor 221 samples the electrical signal and calculates a mean value of the sampled electrical signal in a cycle period to be the DC signal.

Furthermore, the first subtracting amplifier module 23 includes a subtractor 232 and a compensation amplifier 233. The subtractor 232 is electrically connected with the compensation amplifier 233. The subtractor 232 is electrically connected with the feedback attenuation module 21 and the first filter module 22 to receive the electrical signal and the DC signal. The subtractor 232 calculates the difference between the electrical signal and the DC signal and outputs the difference to the compensation amplifier 233.

The compensation amplifier 233 detects a loading of the power converter 13. When the loading of the power converter 13 is greater than a threshold value, the difference between the electrical signal and the DC signal is amplified by a first compensation parameter to be the ripple compensation signal $V_{feedforward}$, and the ripple compensation signal $V_{feedforward}$ is outputted to the input terminal of the power converter 13. For example, the threshold value may be an output power (1000 W) or an output current (10 A), but it is not limited herein. When the loading of the power converter 13 is less than the threshold value, the difference between the electrical signal and the DC signal is amplified by a second compensation parameter to be the ripple compensation signal $V_{feedforward}$, and the ripple compensation signal $V_{feedforward}$ is outputted to the output terminal of the power converter 13.

In the preferred embodiment, the first compensation parameter is greater than the second compensation parameter. The ripple compensation signal $V_{feedforward}$ is equal to the difference between the electrical signal and the DC signal times the first compensation parameter or the second compensation parameter. Alternatively, in a different embodiment, the first compensation parameter may be less than the second compensation parameter. The ripple compensation signal $V_{feedforward}$ is also equal to the difference between the electrical signal and the DC signal times the first compensation parameter or the second compensation parameter.

The aforementioned embodiment implements a digital processing as shown in FIG. 3, but the present invention may be also implemented in an analog processing.

Figure 4:
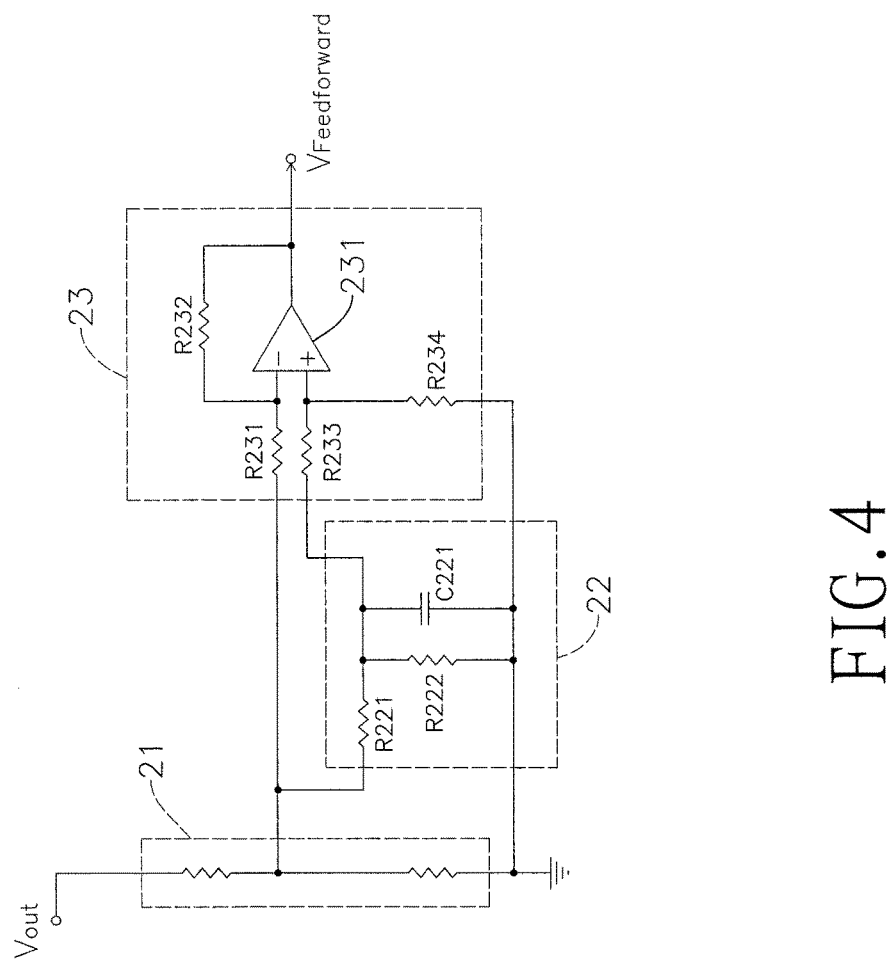
FIG. 4 is a circuit view by using an analog processing in the preferred embodiment of the present invention.

With reference to FIG. 4, in a preferred embodiment of the present invention, the feedback attenuation module 21 is a bleeder circuit to proportionally attenuate the output voltage Vout. Therefore, a proper voltage from the attenuation output terminal of the feedback attenuation module 21 is provided for the first subtracting amplifier module 23. The voltage value exceeding an applicable range for the first subtracting amplifier module 23 may be avoided.

The first filter module 22 includes two filter resistors R221, R222 and a filter capacitor C221. The two filter resistors R221, R222 are serially connected in a serial connecting point. The two filter resistors R221, R222 are connected in series between the feedback attenuation module 21 and a ground. The filter capacitor C221 is connected between the serial connecting point of the two filter resistors R221, R222 and the ground.

The first subtracting amplifier module 23 includes a first resistor R231, a second resistor R232, a third resistor R233, a fourth resistor R234 and a first amplifier 231. The first amplifier 231 includes a non-inverting input terminal, an inverting input terminal and an output terminal. The first resistor R231 is connected between the attenuation output terminal of the feedback attenuation module 21 and the inverting input terminal of the first amplifier 231. The second resistor R232 is connected between the inverting input terminal and the output terminal of the first amplifier 231. The third resistor R233 is connected between the serial connecting point of the two filter resistors R221, R222 and the non-inverting input terminal of the first amplifier 231. The fourth resistor R234 is connected between the non-inverting input terminal of the first amplifier 231 and the ground. The output terminal of the first amplifier 231 outputs the ripple compensation signal $V_{feedforward}$ to the input terminal of the power converter 13.

Figure 5:
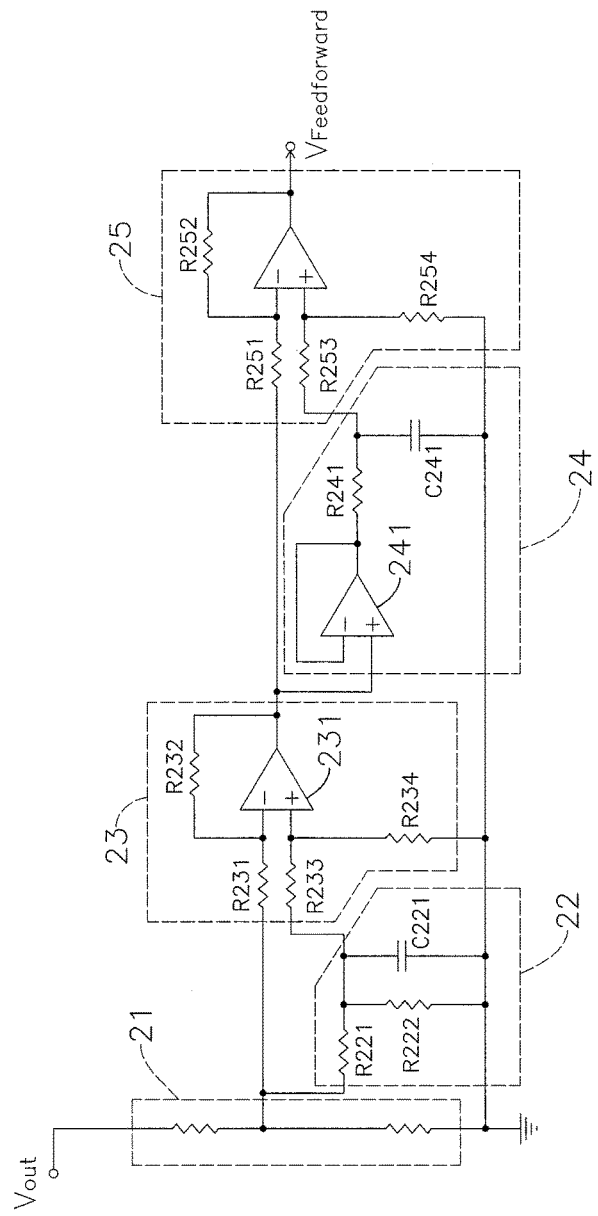
FIG. 5 is a circuit view by using the analog processing in another preferred embodiment of the present invention.

With reference to FIG. 5, in another preferred embodiment of the present invention, the feed forward controlling circuit 20 for voltage ripple restraint further includes a second filter module 24 and a second subtracting amplifier module 25. The second filter module 24 includes a second amplifier 241, a resistor R241 and a capacitor C241. The second amplifier 241 includes a non-inverting input terminal, an inverting input terminal and an output terminal. The second non-inverting input terminal is connected with the first output terminal of the first amplifier 231 of the first subtracting attenuation module 23. The second inverting input terminal is connected with the second output terminal of the second filter module 24. The second output terminal is connected with one terminal of the capacitor C241 via the resistor R241. Another terminal of the capacitor C241 is connected with the ground.

The second subtracting amplifier module 25 includes a first resistor R251, a second resistor R252, a third resistor R253, a fourth resistor R254 and a first amplifier 251. The first amplifier 251 includes a non-inverting input terminal, an inverting input terminal and an output terminal. The first resistor R251 of the second subtracting amplifier module 25 is connected between the output terminal of the first amplifier 231 of the first subtracting amplifier module 23 and the inverting input terminal of the first amplifier 251 of the second subtracting amplifier module 25. The second resistor R252 of the second subtracting amplifier module 25 is connected between the inverting input terminal and the output terminal of the first amplifier 251 of the second subtracting amplifier module 25. The third resistor R253 of the second subtracting amplifier module 25 is connected between a serial connecting point of the resistor R241 and the capacitor C241 of the second filter module 24 and the non-inverting input terminal of the first amplifier 251 of the second subtracting amplifier module 25. The fourth resistor R254 of the second subtracting amplifier module 25 is connected between the non-inverting input end of the first amplifier 251 of the second subtracting amplifier module 25 and the ground.

In the preferred embodiment of FIG. 5 of the present invention, the first filter module 22 and the first subtracting amplifier module 23 perform a first filtering in the output voltage and calculates a difference between the electrical signal and the DC signal to obtain the ripple compensation signal. Moreover, the ripple compensation signal is further filtered by the second filter module 24 and the second subtracting amplifier module 25 to remove the DC portion and keep the better voltage ripple so as to generate the better ripple compensation signal.

Figure 6:
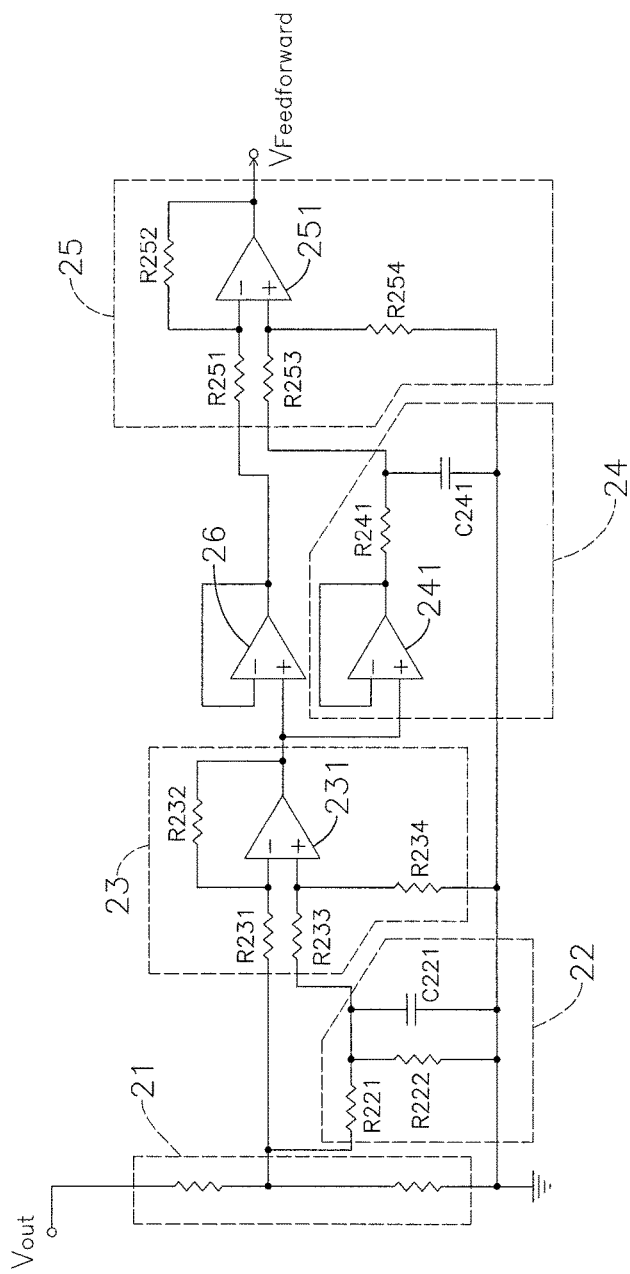
FIG. 6 is a circuit view by using the analog processing in still another preferred embodiment of the present invention.

With reference to FIG. 6, in another preferred embodiment of the present invention, the feed forward controlling circuit 20 further includes a third amplifier 26. The third amplifier 26 includes a non-inverting input terminal, an inverting input terminal and an output terminal. The non-inverting input terminal of the third amplifier 26 is connected with the output terminal of the first amplifier 231 of the first subtracting amplifier module 23. The inverting input terminal of the third amplifier 26 is connected with the output terminal of the third amplifier 26. The output terminal of the third amplifier 26 is electrically connected with the non-inverting input terminal of the first amplifier 251 of the second subtracting amplifier module 25 via the first resistor R251 of the second subtracting amplifier module 25.

When the power converter 13 is overloaded, i.e. the loading of the power converter 13 is greater than a threshold value, the ripple of the output voltage is larger. Therefore, a larger compensation parameter is needed to amplify the difference between the electrical signal and the DC signal so as to generate a larger ripple compensation signal $V_{feedforward}$. The larger ripple compensation signal $V_{feedforward}$ is used to perform a feed forward control in the control signal generated by the controller 14. In contrast, when the power converter 13 is under loaded, i.e. the loading of the power converter is less than the threshold value, the ripple of the output voltage is smaller. Therefore, a smaller compensation parameter is needed to amplify the difference between the electrical signal and the DC signal so as to generate a smaller ripple compensation signal $V_{feedforward}$. The smaller ripple compensation signal $V_{feedforward}$ is used to perform the feed forward control in the control signal generated by the controller 14.

The compensation amplifier 233 generates different ripple compensation signals $V_{feedforward}$ with difference values for different loading situations to precisely perform the feed forward control in the control signal generated by the controller 14. Therefore, the ripple in the output voltage Vout of the power converter 13 may be efficiently eliminated.

Figure 7:
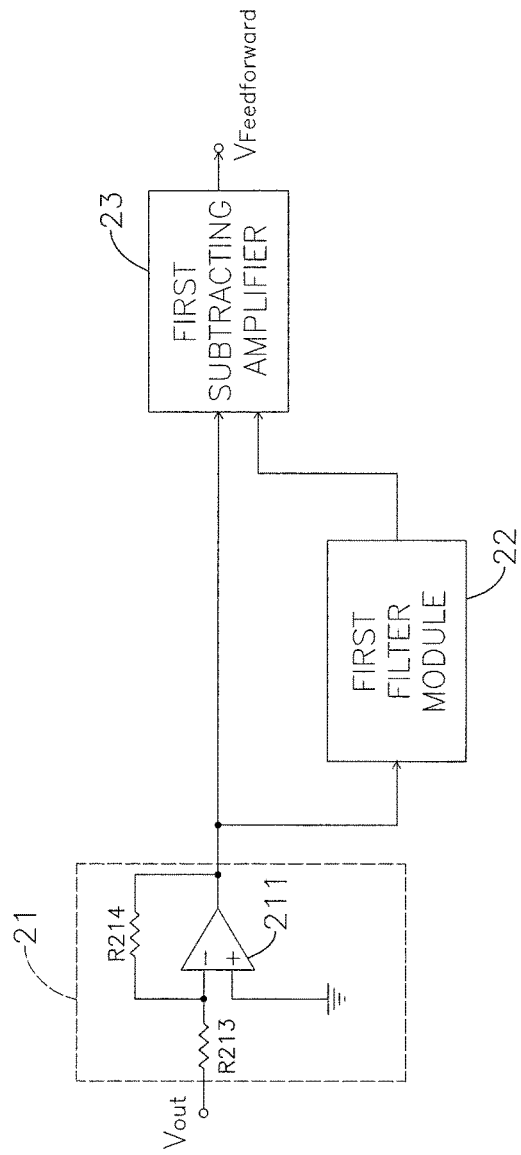
FIG. 7 is a system block diagram of a feed forward controlling circuit for voltage ripple restraint with negative power output in the preferred embodiment of the present invention.

In addition, the power converter 13 may output negative power, but the feed forward controlling circuit 20 for voltage ripple restraint may only process positive voltage value. Therefore, as shown in FIG. 7, the feedback attenuation module 21 may include a first inverting resistor R213, a second inverting resistor R214 and an inverting amplifier 211. The inverting amplifier 211 includes a non-inverting input terminal, an inverting input terminal and an output terminal. The non-inverting input terminal of the inverting amplifier 211 is grounded. The inverting input terminal of the inverting amplifier 211 is electrically connected with the output terminal of the inverting amplifier 211 via the second inverting resistor R214. The inverting input terminal of the inverting amplifier 211 is further electrically connected with the output terminal of the power converter 13 via the first inverting resistor R213 to receive the output voltage Vout. In the present preferred embodiment, the inverting amplifier 211 of the feedback attenuation module 21 inverts the output voltage Vout and attenuates the output voltage Vout so as to generate the electrical signal. The electrical signal is outputted from the output terminal of the inverting amplifier 211.

Figure 8A:
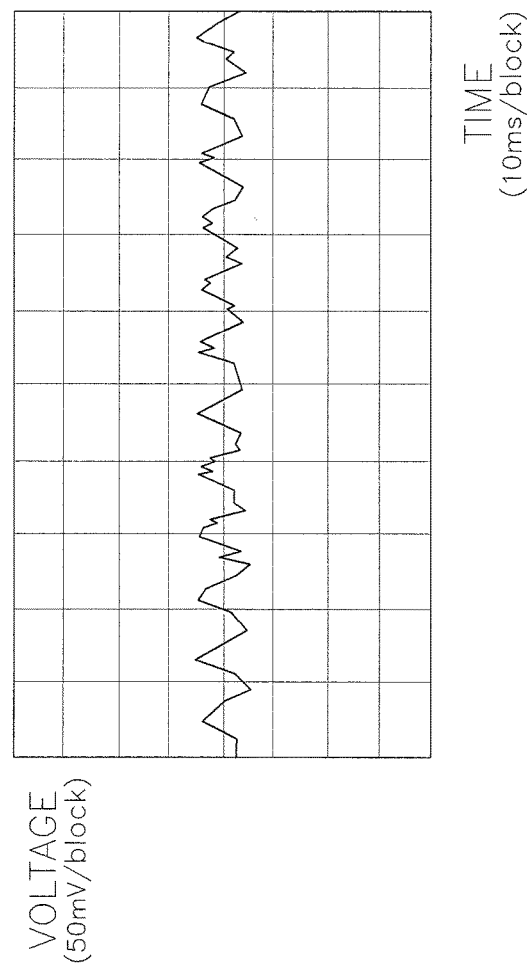
FIG. 8A is a waveform view of original output signal when the power converter is under loaded.
Figure 8B:
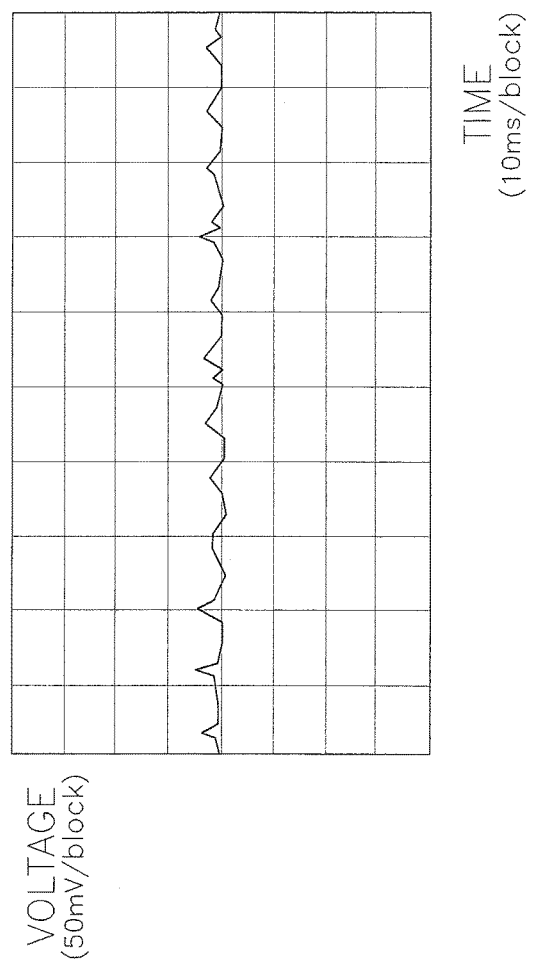
FIG. 8B is a waveform view of the original output signal when the power converter is under loaded and the feed forward controlling circuit is used in the present invention.

With reference to FIG. 8A, FIG. 8B, FIG. 9A, FIG. 9B, FIG. 10A, and FIG. 10B, FIG. 8A is an original output voltage waveform when the power converter 13 is under loaded. FIG. 8B is an output voltage waveform when the power converter is under loaded and the feed forward controlling circuit 20 for voltage ripple restraint is applied to the power converter. The output voltage waveform in FIG. 8B showing a peak-to-peak value of the ripple is efficiently reduced.

Figure 9A:
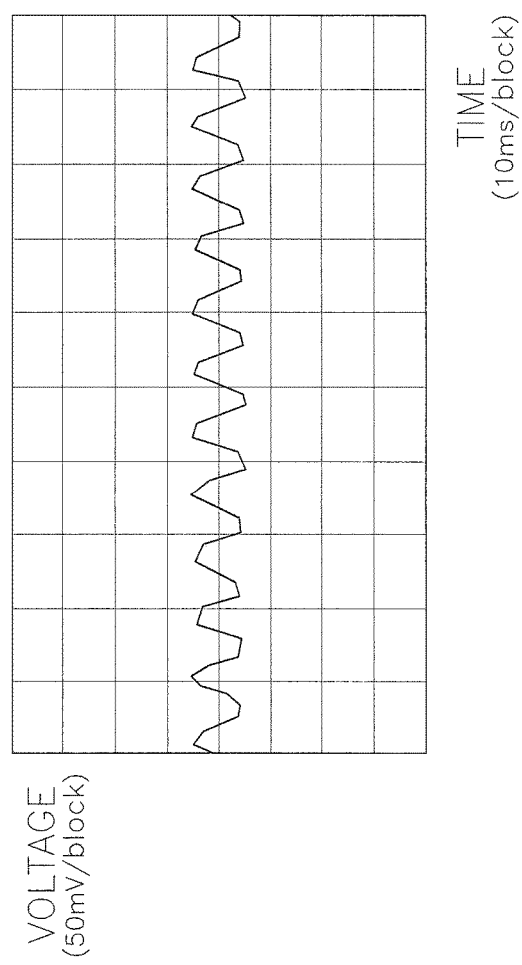
FIG. 9A is a waveform view of the original output signal when the power converter is normally loaded.
Figure 9B:
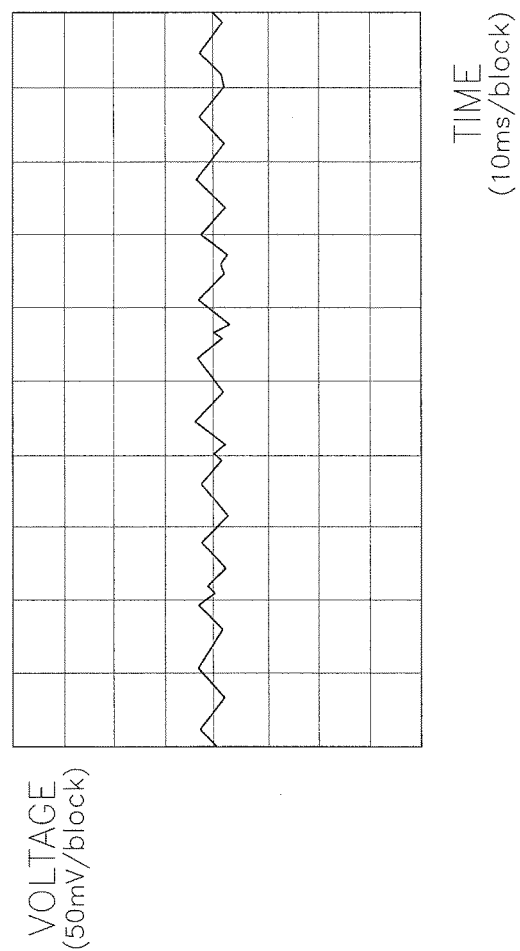
FIG. 9B is a waveform view of the original output signal when the power converter is normally loaded and the feed forward controlling circuit is used in the present invention.

FIG. 9A is the original output waveform when the power converter is normally loaded. FIG. 9B is the output voltage waveform when the power converter is normally loaded and the feed forward controlling circuit 20 for voltage ripple restraint is applied to the power converter. The peak-to-peak value of the ripple in FIG. 9B is also reduced.

Figure 10A:
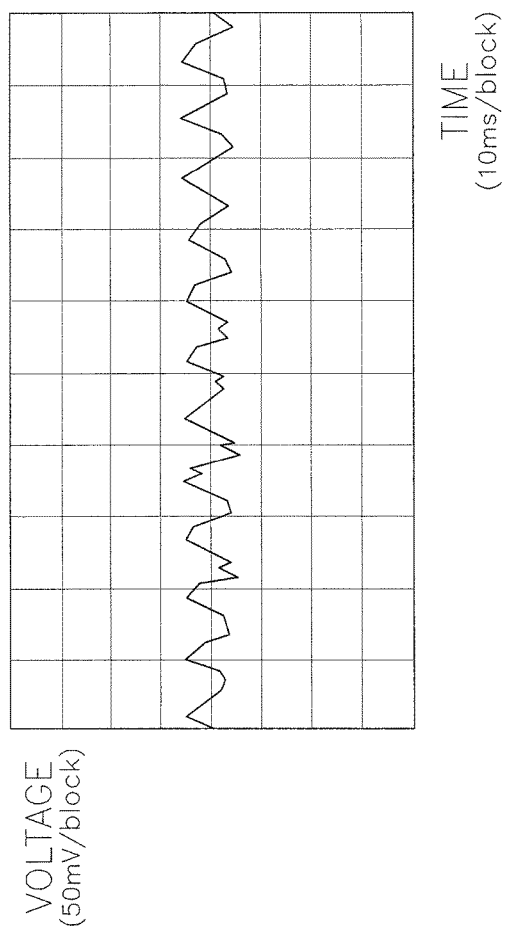
FIG. 10A is a waveform view of the original output signal when the power converter is overloaded.
Figure 10B:
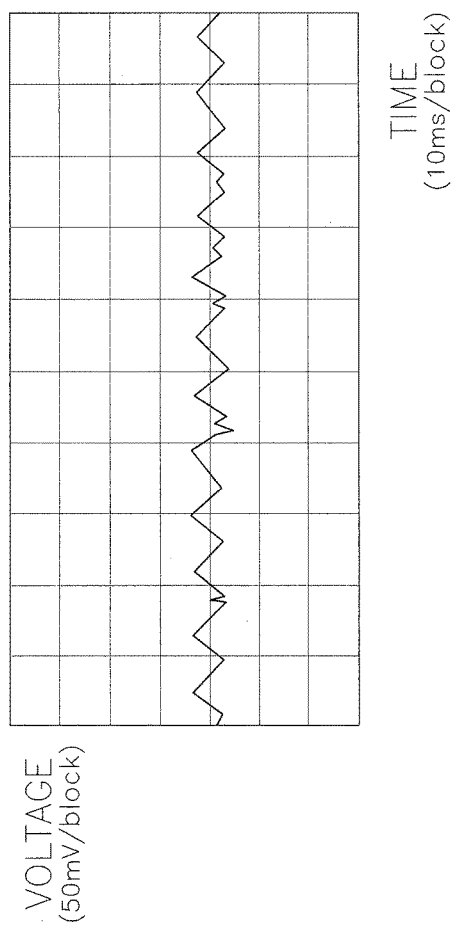
FIG. 10B is a waveform view of the original output signal when the power converter is overloaded and the feed forward controlling circuit is used in the present invention.

FIG. 10A is the original output voltage waveform when the power converter 13 is overloaded. FIG. 10B is the output voltage waveform when the power converter is overloaded and the feed forward controlling circuit 20 for voltage ripple restraint is applied to the power converter. The peak-to-peak value of the ripple in FIG. 10B is also reduced efficiently.

Figure 11:
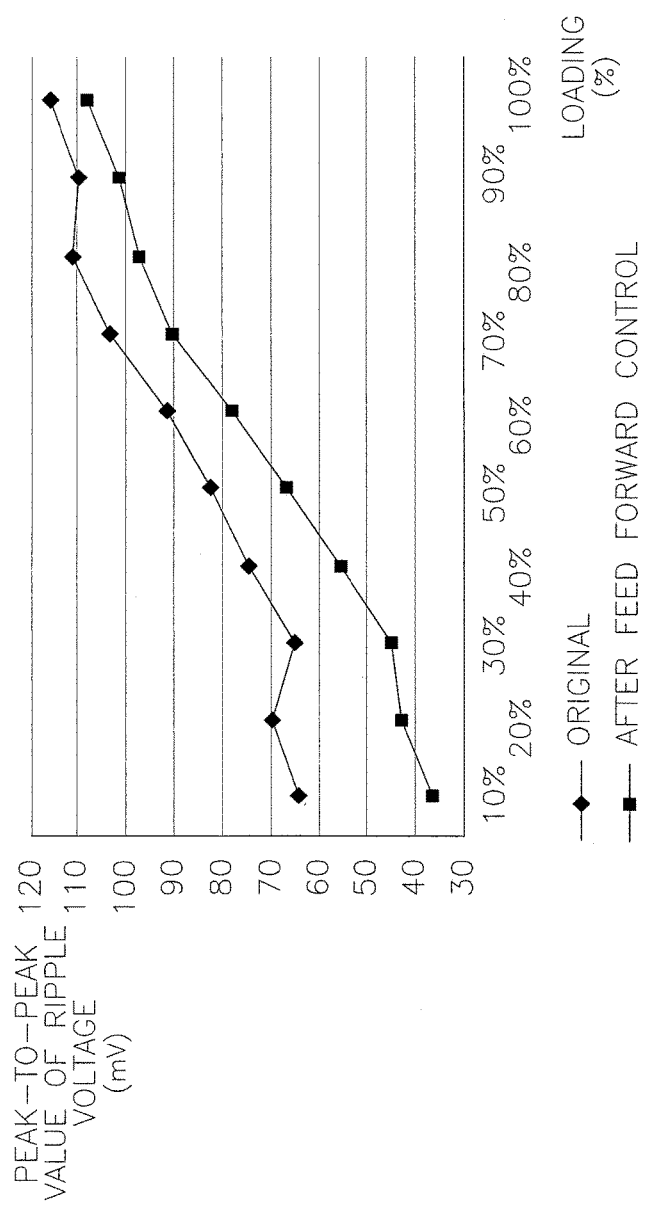
FIG. 11 is a broken-line view of the amplitude of the ripple voltages of the power converter in different loadings when the feed forward controlling circuit is used in the present invention.

FIG. 11 shows the peak-to-peak values of the ripples as the power converter 13 is operated at different loading percentages when the overall load is 3000 watts. As shown in FIG. 11, for the same loading percentage, it is clear to see that the peak-to-peak value of the ripple without the feed forward controlling circuit 20 for voltage ripple restraint is greater than the peak-to-peak value of the ripple with the feed forward controlling circuit 20 for voltage ripple restraint.

Figure 12:
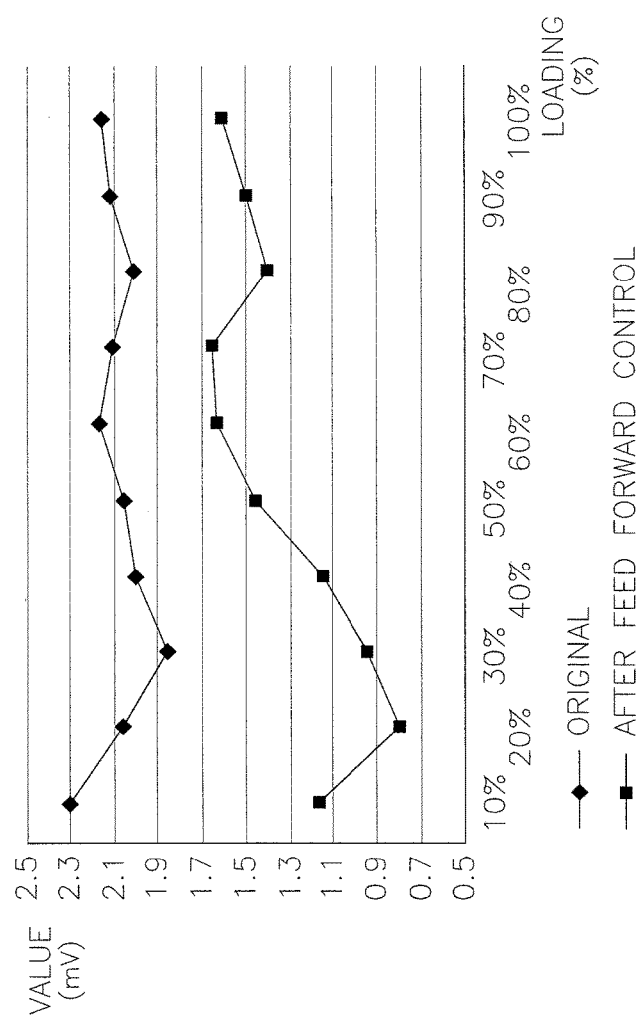
FIG. 12 is a broken-line view of noise values of the power converter in different loadings when the feed forward controlling circuit is used in the present invention.

FIG. 12 shows noise values in different loadings with or without the feed forward controlling circuit 20 for voltage ripple restraint. As shown in FIG. 12, no matter what the loadings are, it is clear to see that the noise values without the feed forward controlling circuit 20 for voltage ripple restraint are greater than the noise values with the feed forward controlling circuit 20 for voltage ripple restraint. Therefore, the ripple of the output voltage in the power converter may be efficiently reduced without having the communication module to transmit signals. The cost is decreased and the difficulty of the circuit design is reduced.

Figure 13:
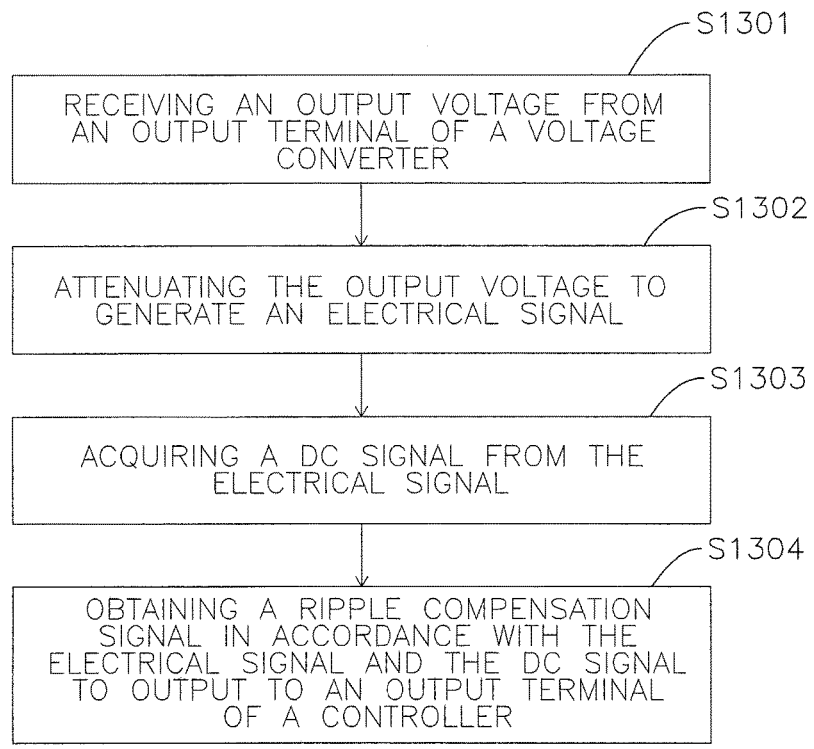
FIG. 13 is a flow chart of a feed forward controlling method for voltage ripple restraint in the present invention.
Figure 14:
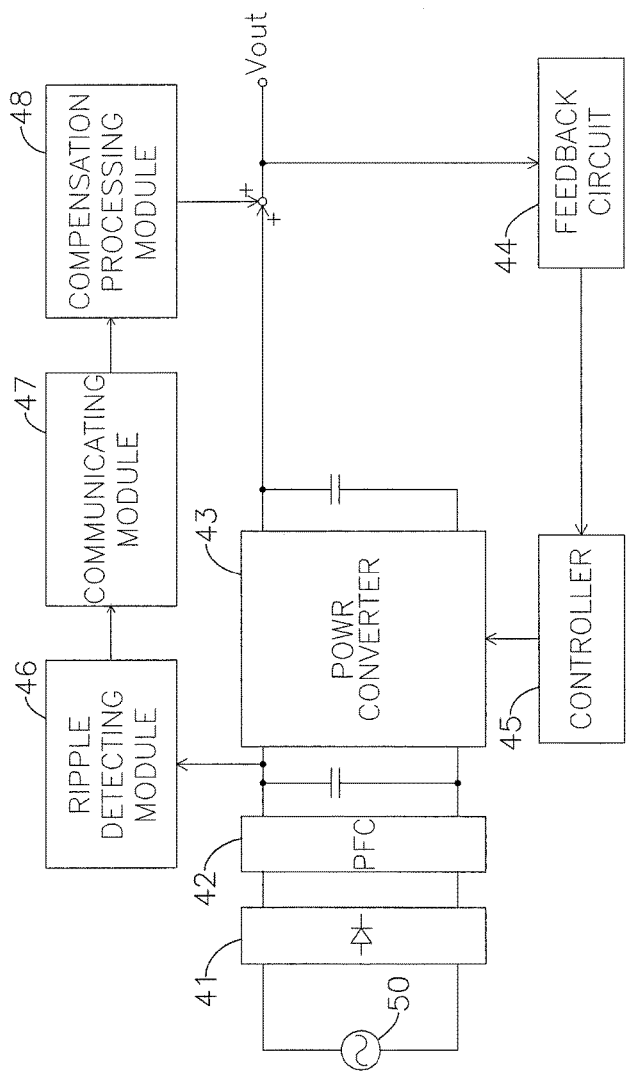
FIG. 14 is a system block diagram of the conventional power supply for ripple restraint.

Moreover, with reference to FIG. 13, a feed forward controlling method for voltage ripple restraint is also provided in the present invention and the method includes the following steps.

In step S1301, it is to receive an output voltage from an output terminal of a voltage converter. In step S1302, it is to attenuate the output voltage to generate an electrical signal. In step S1303, it is to acquire a DC signal from the electrical signal. In step S1304, it is to obtain a ripple compensation signal in accordance with the electrical signal and the DC signal and output the ripple compensation signal to an output terminal of a controller. The output terminal of the controller outputs a control signal to control the power converter.

In the present preferred embodiment, the DC signal in step S1303 is obtained by removing AC portion in the electrical signal. The ripple compensation signal in step S1304 is obtained by calculating the difference between the electrical signal and the DC signal and amplifying the difference.

In step S1302 of attenuating the output voltage to generate the electrical signal, the output voltage may be further inverted to generate the electrical signal.

In step S1303 of acquiring the DC signal from the electrical signal, the electrical signal is sampled and a mean value of the sampled electrical signal in a cycle period is calculated to be the DC signal.

In step S1304 of obtaining the ripple compensation signal in accordance with the electrical signal and the DC signal to output to the output terminal of the controller, the loading of the power converter is detected. When the loading of the power converter is greater than the threshold value, the difference between the electrical signal and the DC signal is amplified in accordance with the first compensation parameter to be the ripple compensation signal. When the loading of the power converter is less than the threshold value, the difference between the electrical value and the DC value is amplified in accordance with the second compensation parameter to be the ripple compensation signal.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A feed forward controlling circuit for voltage ripple restraint connected with a power converter and a controller to reduce voltage ripple of an output voltage from the power converter, and an output terminal of the controller outputting a control signal to control the power converter, and the feed forward controlling circuit for voltage ripple restraint comprising:
   a feedback attenuation module including:
      an attenuation input terminal connected with an output terminal of the power converter to receive the output voltage and attenuating the output voltage to generate an electrical signal; and
      an attenuation output terminal for outputting the electrical signal;
   a first filter module electrically connected with the attenuation output terminal of the feedback attenuation module to receive the electrical signal and to filter AC portion in the electrical signal so as to generate a DC signal;
   a first subtracting amplifier module electrically connected with the attenuation output terminal of the feedback attenuation module and the first filter module to receive the electrical signal and the DC signal and calculate a difference between the electrical signal and the DC signal, and the first subtracting amplifier module further amplifying the difference to generate a ripple compensation signal and output the ripple compensation signal to the output terminal of the controller;
   wherein the first filter module includes:
      two filter resistors serially connected with each other in a serial connecting point to couple between the attenuation output terminal of the feedback attenuation module and a ground; and
      a filter capacitor connected between the serial connecting point and the ground.

2. The feed forward controlling circuit for voltage ripple restraint as claimed in claim 1, wherein the feedback attenuation module is a bleeder circuit.

3. The feed forward controlling circuit for voltage ripple restraint as claimed in claim 1, wherein the feedback attenuation module includes:
   a first inverting resistor;
   a second inverting resistor; and
   an inverting amplifier including:
      a non-inverting input terminal electrically grounded;
      an inverting input terminal electrically connected with the output terminal of the power converter via the first inverting resistor to receive the output voltage; and
      an output terminal configured to generate the electrical signal and connected to the inverting input terminal of the inverting amplifier via the second inverting resistor.

4. The feed forward controlling circuit for voltage ripple restraint as claimed in claim 1, wherein the first subtracting amplifier module includes:
   a first amplifier having a non-inverting input terminal, an inverting input terminal, and an output terminal for outputting the ripple compensation signal to the output terminal of the controller;
   a first resistor connected between the attenuation output terminal of the feedback attenuation module and the inverting input terminal of the first amplifier;
   a second resistor connected between the inverting input terminal and the output terminal of the first amplifier;
   a third resistor connected between the serial connecting point of the two filter resistors and the non-inverting input terminal of the first amplifier; and
   a fourth resistor connected between the non-inverting input terminal of the first amplifier and the ground.

5. The feed forward controlling circuit for voltage ripple restraint as claimed in claim 4, further comprising:
   a second filter module including:
      a resistor;
      a capacitor electrically connected between the resistor and the ground; and
      a second amplifier having:
         a second non-inverting input terminal connected with the output terminal of the first amplifier of the first subtracting amplifier module;
         a second inverting input terminal; and
         a second output terminal connected with the second inverting input terminal and further connected with the capacitor via the resistor; and
   a second subtracting amplifier module having:
      a first amplifier having a non-inverting input terminal, an inverting input terminal and an output terminal;
      a first resistor connected between the output terminal of the first amplifier of the first subtracting amplifier module and the inverting input terminal of the first amplifier of the second subtracting amplifier module;
      a second resistor connected between the inverting input terminal and the output terminal in the first amplifier;

a third resistor connected between a connecting node for the resistor and the capacitor of the second filter module and the non-inverting input terminal of the first amplifier of the second subtracting amplifier module; and a fourth resistor connected between the non-inverting input terminal of the first amplifier of the second subtracting amplifier module and the ground.

6. The feed forward controlling circuit for voltage ripple restraint as claimed in claim 5, further comprising:

a third amplifier having:

a non-inverting input terminal electrically connected with the output terminal of the first amplifier of the first subtracting amplifier module;

an inverting input terminal; and an output terminal electrically connected with the inverting input terminal of the third amplifier and further electrically connected with the non-inverting input terminal of the first amplifier of the second subtracting amplifier module via the first resistor of the second subtracting amplifier module.

7. A feed forward controlling method for voltage ripple restraint performed by the feed forward controlling circuit as claimed in claim 1, comprising steps of:

receiving an output voltage from an output terminal of a power converter;

attenuating the output voltage to generate an electrical signal;

acquiring a DC signal from the electrical signal;

obtaining a ripple compensation signal in accordance with the electrical signal and the DC signal and outputting the ripple compensation signal to an output terminal of a controller; and wherein the output terminal of the controller outputs a control signal to control the power converter.

8. The feed forward controlling method for voltage ripple restraint as claimed in claim 7, wherein the DC signal is obtained by filtering AC portion in the electrical signal, and the ripple compensation signal is obtained by amplifying a difference between the DC signal and the electrical signal.

9. The feed forward controlling method for voltage ripple restraint as claimed in claim 8, wherein the step of attenuating the output voltage to generate the electrical signal further comprises a step of inverting the output voltage to generate the electrical signal.

10. The feed forward controlling method for voltage ripple restraint as claimed in claim 7, wherein the step of attenuating the output voltage to generate the electrical signal further comprises a step of inverting the output voltage to generate the electrical signal.

* * * * *